United States Patent [19]
Nasvytis

[11] 3,793,910
[45] Feb. 26, 1974

[54] VARIABLE SPEED FRICTION DRIVE

[76] Inventor: Algirdas L. Nasvytis, 10823 Magnolia, Cleveland, Ohio 44106

[22] Filed: Oct. 2, 1972

[21] Appl. No.: 294,016

[52] U.S. Cl. .................................. 74/796, 74/690
[51] Int. Cl. ...................... F16h 15/50, F16h 37/06
[58] Field of Search ............................ 74/796, 690

[56] References Cited
UNITED STATES PATENTS

| | | | |
|---|---|---|---|
| 2,205,768 | 6/1940 | Pearce, Jr. | 74/796 |
| 2,209,497 | 7/1940 | Winger et al. | 74/796 |
| 2,696,888 | 12/1954 | Chillson et al. | 74/796 X |
| 2,973,671 | 3/1961 | Elkins | 74/796 |

*Primary Examiner*—Arthur McKeon
*Attorney, Agent, or Firm*—Hill, Sherman, Meroni, Gross & Simpson

[57] ABSTRACT

A variable speed planetary transmission in which a plurality of drive components are constructed in the form of interfaced conical friction members mounted for rotation about parallel axes and axially and radially relatively manipulatable to provide variable ratio gearing members. A preferred embodiment embodies planet rollers of a double conical configuration in rolling contact with mating rollers of reverse conical configuration and in which axial control means are provided for manipulating the axial positions of the cooperating conical members to provide a variable speed connection between sun and ring gear members. A further embodiment of the invention provides a differential variable speed drive wherein multiconical epicyclic transmission elements are employed to provide a varying output smoothly infinitely adjustable from a high forward speed downwardly through zero output to reverse speed, all without requiring a variation in the speed of rotation to the input shaft of the transmission.

9 Claims, 6 Drawing Figures

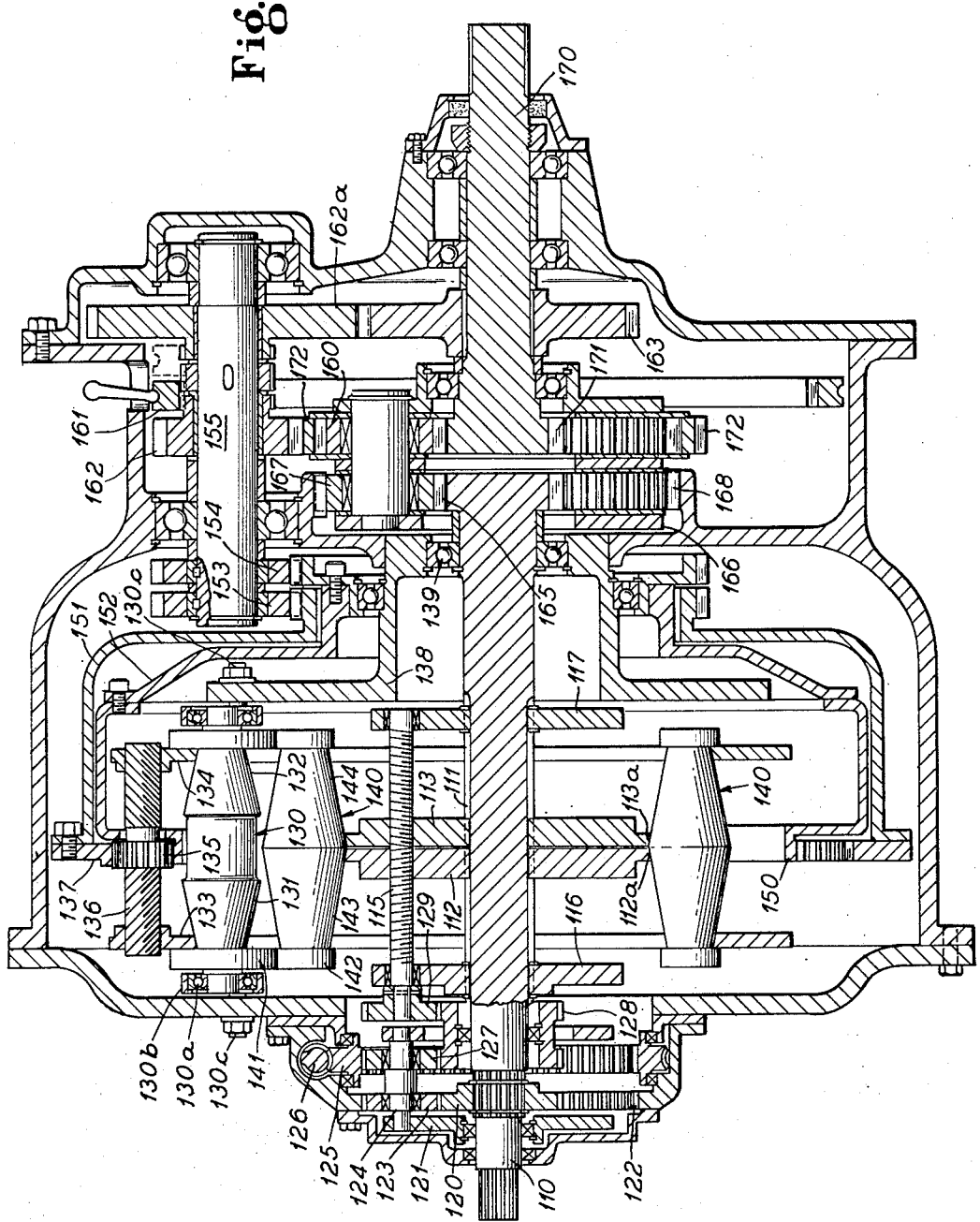

VARIABLE SPEED FRICTION DRIVE

BACKGROUND OF THE INVENTION

Planetary or eipcyclic transmission devices employing friction rollers for the transmission of power, are well known in the art of gearing. A number of proposals have been advanced for providing variable speed friction drive systems. Perhaps the most commonly considered of such devices are the toroidal mechanisms having interfacing coaxially mounted toroidal races with one or more tiltable rollers positioned therein for rotation about axes transverse to and intersecting the axis of rotation of the toroidal members. Other devices have embodied the use of pairs of complementary conical members combined with intermediate roller or belt force transmitting means. To my knowledge, however, such prior systems have been unsuccessful in providing a truly satisfactory, simple, transmission capable of forward and reverse drive outputs in a simple manner. Further, experimentation with such prior systems has indicated that friction losses, pre-loading problems, excessive wear, and the like, have prevented general adoption of any such systems in widespread commercial use, especially for a higher horsepower range. In accordance with the present invention, the advantages of wide range speed change have been accomplished through an extremely simple system which is capable, in several of its embodiments, of handling heavy torques while remaining simple in design.

SUMMARY OF THE INVENTION

In a simple form of the invention, a variable speed planetary type drive system comprises a sun roller comprising a pair of axially separably disks with oppositely directed conical surfaces. A plurality, typically three, planets are provided for rotation with the disks and comprise axially spaced coaxial conical members rotatable about an axis parallel to the axis of the sun and having oppositely directed conical surfaces compatible with the disks comprising the sun but having a substantially longer axial surface than the sun disks. The annular ring gear constructed for cooperation with the planet rollers comprises a pair of split disks axially separable and likewise having conical configuration for cooperation with the planet rollers. Assuming, as one case, that the planet rollers each have a maximum radius at the centers of their axial lengths and taper toward opposite ends, then as the sun disks are adjusted axially toward each other, the planet rollers will be forced radially outwardly and the ring disks will be moved axially apart from each other to accommodate the radial movement. The result of such an adjustment is to provide a gradually increasing gear reduction which has a maximum, when the largest radial contact occurs between the sun roller and the planet rollers, and hence the smallest radial contact occurs between the ring gear and planet rollers. As in the case of conventional planetary systems, the input of the drive may be attached to the sun, the planet carrier, or the ring and, similarly, the output may comprise one or the other of the two remaining undriven elements.

It will be apparent to those familiar with the art that when disks of finite width are employed in friction engagement with conical surfaces, some slippage will occur between the edges of the disk and conical surface cooperating with the disk. I have found, however, that by keeping the contact surfaces narrow and the slope of the conical surfaces low, the slippage is within practical limits, and actually enhances axial adjustment movements of the roller components.

An additional embodiment of the invention comprises the utilization of planet elements each consisting of a pair of dual cone roller members in variable contact with each other and rotating between compatible dual conical ring and sun element. By varying the ratio between the rollers of each planet element, and by providing a differential input to the sun and ring elements, an output is provided which ranges from a relatively high forward speed downwardly through zero to a relatively lower reverse speed in a manner suitable for such transmission uses as land vehicles or boats.

It is, accordingly, an object of the present invention to provide a novel, adjustable, friction drive system capable of smooth ratio change over a relatively wide range and in a simple structural manner.

DESCRIPTION OF THE DRAWINGS

FIG. 3 is a cross-sectional view of a second embodiment of the present invention;

DETAILED DESCRIPTION

Figure 1:
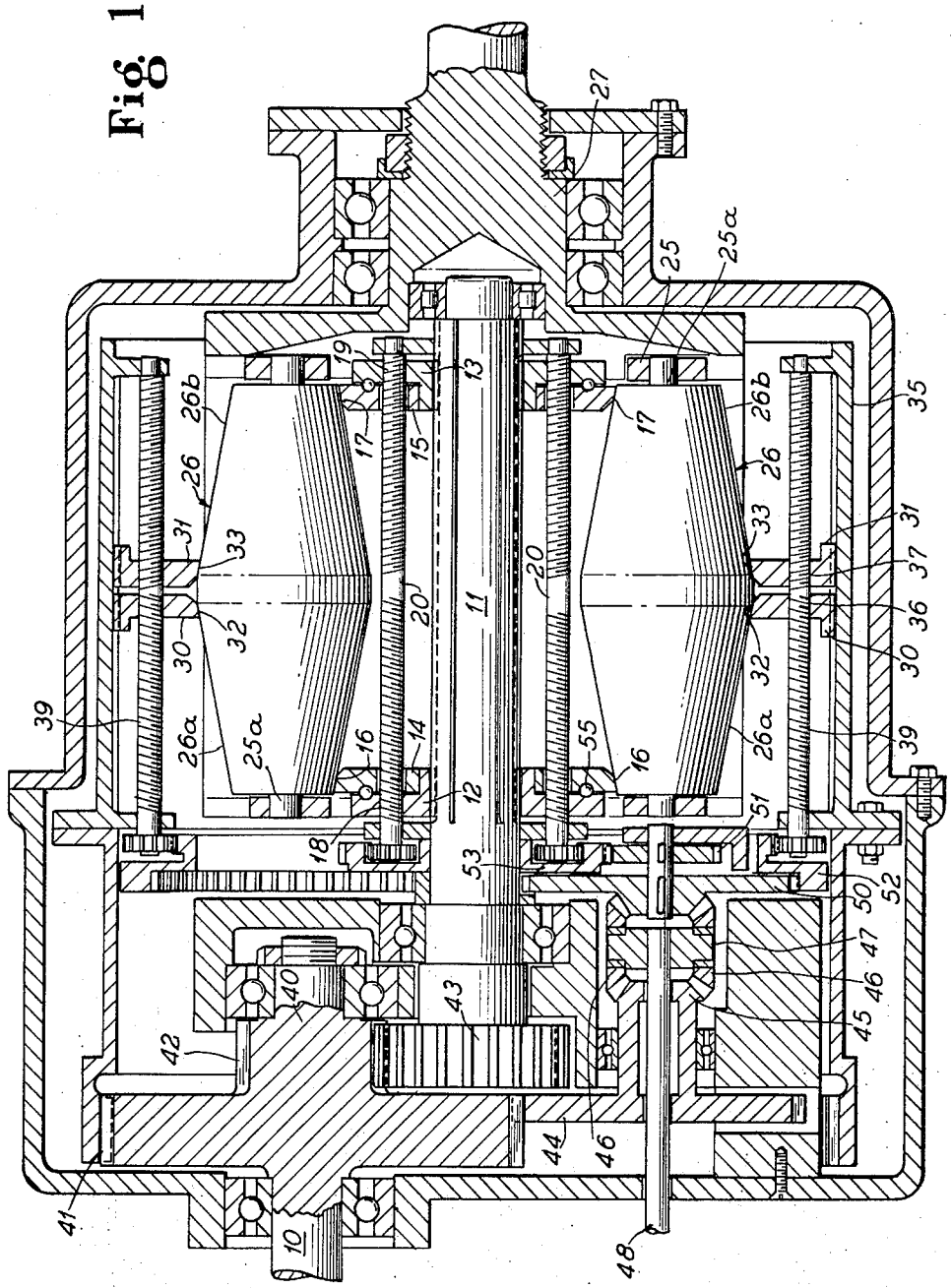
FIG. 1 is a cross-sectional view of a friction drive constructed in accordance with the present invention.

A first embodiment of the present invention is shown in FIG. 1. There, input shaft 10 rotatably drives a sun shaft 11 carrying supports 12, 13 splined thereto for rotation therewith. The elements 12 and 13 each support conical disks 14 and 15 respectively having respective conical surfaces 16, 17. The supports 12 and 13 are threaded, as at 18, 19 to accommodate an adjustment shaft 20 arranged for rotation such that rotation in one direction provides movement of the conical members 14 and 15 toward each other and rotation in the opposite direction provides movement thereof away from each other. A rigid planet carrier 25 supports a plurality of axial roller shafts 25a in fixed peripheral relation to each other but permitting radial movement relative to the sun axis. The carrier 25 is in turn positively connected to an output shaft 27 for rotation thereof. Each of the shafts 25a carries a roller 26 having dual coned surfaces 26a and 26b for cooperation with the tapered surfaces of the ring elements 30, 31 having respective conical surfaces 32, 33.

In the embodiment illustrated in FIG. 1, the ring elements 30 and 31 are axially splined to subhousing 35 and are individually threaded at 36, 37, respectively, to accommodate an adjustment screw 39 which is threaded to provide for adjustment of the ring disks 30, 31 toward each other upon one direction of rotation and apart from each other upon opposite rotation. In the embodiment illustrated, it will be clear that rotation of the screws 20 to move the sun disks 14 and 15 toward each other requires, at the same time, a simultaneous movement of the adjustment screw 39 to separate the ring disks 30, 31.

As shown, the input shaft of the transmission of FIG. 1 provides a split power path diverting some of the input to the ring 35 and some of the input to the sun 11. This is accomplished by way of a first input gear 40 which drives the ring 35 by way of gear 41, and a second gear 42 which drives the gear 43 on the end of shaft 11. As shown, the gearing provides one direction of rotation for the ring and an opposite direction of rotation for the sun. The gear 40 simultaneously drives the control gear 44 provided with an output bevel gear 45. The gear 45 drives a pair of differential gears 46 mounted upon spur shafts 47 rigidly carried by a control shaft 48. Rotation of the control gear 44 causes simultanerous reverse rotation control gears 50 and 51 in drive contact with control rings 52 and 53, respectively. The gear ratios between 50 and 51 and their cooperating respective control rings 52 and 53 provide, when the control rod is stationary, and the gear 44 is being rotated by the input shaft 10, a rotation of the control rings 52 and 53 identical with the speed of rotation of the ring gear subcasing 35 and the sun 11, respectively. Accordingly, when the control rod 48 is stationary, no adjustment of the adjustment screws 20 and 39 takes place. It will be seen, however, that if the control rod 48 is rotated, during operation of the drive system, a momentary relative movement of the rings 52 and 53 will occur causing simultaneous counter adjustments of the screws 20 and 39.

Figure 2:
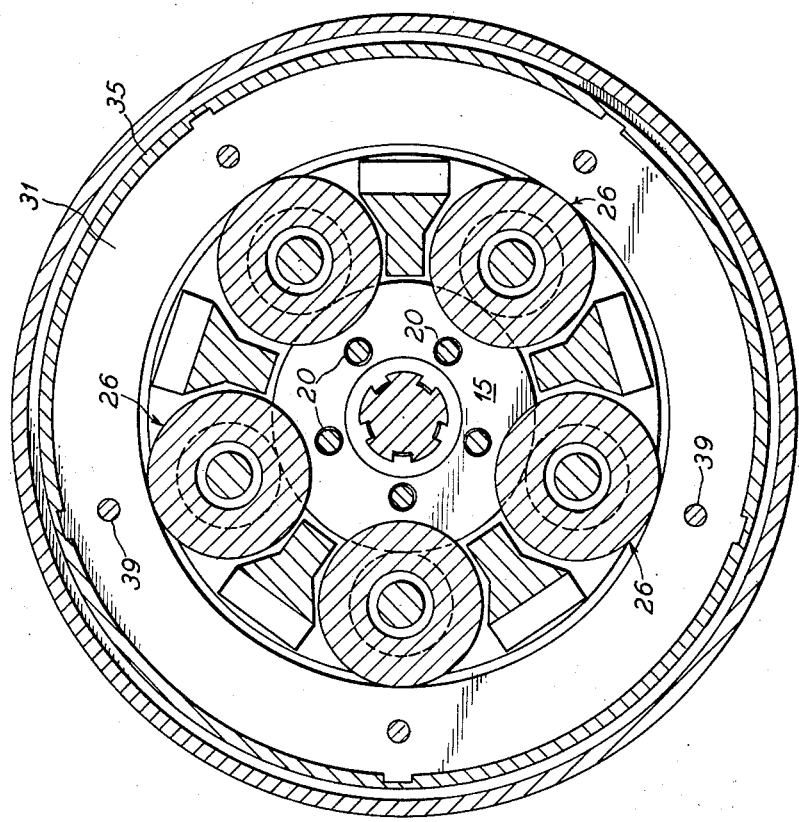
FIG. 2 is a cross-sectional view taken along the line II—II of FIG. 1.

As those skilled in the art of friction gearing are aware, preloading of the friction surfaces is essential to the transmission of substantial torque. In the embodiment illustrated in FIGS. 1 and 2, the drive is preloaded through the utilization of cam balls 55 positioned between the elements 12 and 14 (and similarly between 13 and 15) of the sun. Each of the members 12 and 14 is provided with a plurality of gradually ramped depressions each containing a ball 55. Upon relative rotation between elements 12 and 14 in either direction, the balls ride up the ramped side of the depression to force the members 12 and 14 axially apart, applying a preload to the drive contact. Since the planet roller 25a may radially move with respect to the planet carrier 25 to accommodate radial movement of the rollers 26 upon adjustment, preloading via the ball 55 provides a preload throughout the system in a manner that automatically increases with an increase in the torque transmission.

The gear ratios and speeds may be varied through the ranges, of course. However, a satisfactory transmission may be constructed in general accordance with the embodiment illustrated in FIGS. 1 and 2 where an input of 8,000 rpm is provided with a resultant 6,000 rpm sun roller rotation and a 4,500 ring roller rotation in a reverse direction. In that embodiment, an output rotation of 166 rpm in reverse up to 2,000 rpm rotation forward is provided, with a smooth traverse of that entire speed range through zero rpm. In this arrangement, the speed ratios of the 6,000 rpm sun and 4,500 rpm ring represent a ring-to-sun dimensional ratio of 1.33 and the ratio provided in the illustrated embodiment between the sun roller and ring roller is 1:2. The double cone ratio of the maximum diameter to minimum diameter is 1:1.6. Thus, if the sun roller and ring roller positions on the dual cone rollers 26 provide input and output radii that are equal, the friction drive operates with a ratio of 2. If the spider is stationary with the cone rotating, a 4,500 rpm of the ring will force, in the absence of slipping, the sun roller will be required to rotate $4,500 \times 2 = 9,000$ rpm. Since, however, the sun roller is rotating as a result of gear drive contact, at 6,000 rpm, the cones must rotate in the space at a sufficient rpm to compensate by subtracting 3,000 rpm from the sun. If the ring roller is stationary, rotation of the carrier $N$ rpm will force the sun to rotate $(2 + 1)$ rpm. The sun rotates counterclockwise if the ring rotates clockwise and hence to subtract sun rpm the spider rotates clockwise with $N=3,000/2 + 1 = 1,000$ rpm. On the other hand, the smallest ratio in the friction drive occurs when the cone radius with the sun is a minimum ($r_{min}$) and the radius with the ring is $r_{max}$ then the ratio of the drive equals $2 \times r_{min}/r_{max} = 2/1.6 = 1.25$. If the planet rollers 26 and the carrier 25 are stationary in the space between the sun and the ring, the ring roller will force the sun to rotate $4,500 \times 1.25$ 5,625 rpm or 375 rpm less than the sun rotates, whereby the carrier must rotate counterclockwise to compensate the speed difference an amount $N = 3.75/1.25 + 1$ or 166.6 rpm. If the cone input and output ratio is 1.5, the total drive ratio is $2/1.5 = 1.33$ and output speed is zero. The maximum output rpm occurs when the drive has a maximum ratio $2 \times 1.6 = 3.2$ where $N = 4,500 \times 3.2 - 6,000/3.2 + 1 = 2,000$ rpm. With the above arrangement it is clear that a rotation of the input shaft 10 constantly in the same direction at a substantially uniform speed permits, by the manipulation of the control shaft 48, an output from the transmission providing forward and reverse speeds without need for shiftable clutches or brakes typically employed in transmission devices. Accordingly, an extremely simple structural mechanism is provided.

As above described, the planetary friction drive provides a differential system resulting from the application of input power to two elements of the planetary set.

Figure 4:
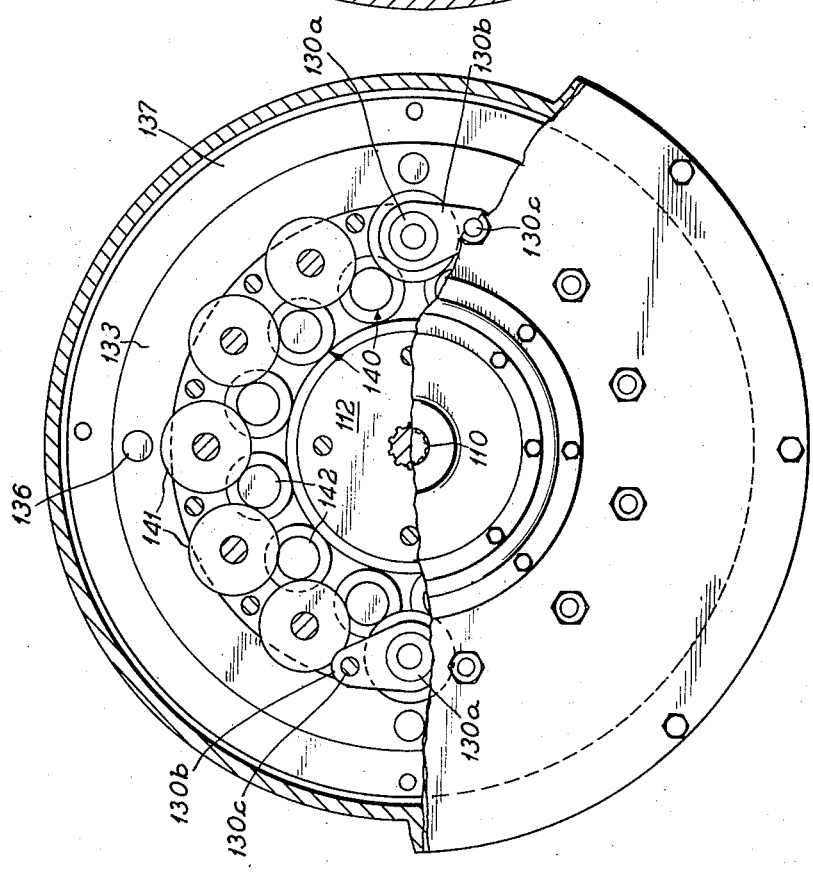
FIG. 4 is a cross-sectional view taken along the line IV—IV of FIG. 3.

In the embodiment of the invention shown in FIGS. 3 and 4, a two-row roller set is provided. In the embodiment illustrated in these Figures, the drive input is applied at the sun shaft 110. The shaft 110 is splined at 111 to carry for axial sliding but fixed rotation, a pair of sun disks 112, 113 adjustably movable by way of a plurality, preferably three equally spaced, adjusting screws 115 carried for free rotation by support plates 116 and 117 splined to the shaft 110. Adjustment of the screws 115 is accomplished by means of a drive take-off from input shaft 110 comprising gear 120 operating as a sun gear to drive a planet carrier 121 against a reaction ring gear 122. The planetary gears 123 carried by the carrier shafts, preferably three in number, 124, carry the shafts around the sun. An adjustment ring gear 125 is mounted for manual adjustment by means of a worm, shown in cross-section at 126. When the ring gear 125 is stationary, adjustment gear 127 moves in the same manner as the gear 123 with the result that gear 128 riding the shaft 110 rotates substantially in the same manner as gear 120, with the result that the adjustment drive gear 129 is non-rotative. This is true since the axis of screw 115 is the same radius away from the axis of shaft 110 as is the axis of the shaft 124. When an adjustment is desired, the worm 126 is rotated, causing a relative rotation of the ring and an adjustment, either forward or reverse of the screws 115.

This adjustment causes separation or closure of the disks 112, 113.

The two-row planet system comprises dual cone outer row members 130 having conical surfaces 131 and 132 which cooperate, respectively, with the pair of split rings annulus elements 133 and 134. The members 130 are rotatably carried in bearing supports 130a carried by links 130b pivotally carried by support pins 130c in the rigid carrier member 138, rotatably carried on the shaft 110 by way of bearings 139. Rollers 130 cooperate with an inner row of rollers 140 by way of mating cylindrical friction gear surfaces 141, 142, and the conical surfaces 143, 144 of the rollers 140 cooperate with the mating tapered surfaces 112a and 113a of the respective sun disks.

Adjustment will required, of course, movement of the planet rollers relative to each other and relative to the sun and the ring. Thus, if the sun disks 112, 113 are separated from each other axially, the surfaces 112a, 113a will contact the rollers 140 at a point of smaller roller diameter which means, in turn, that the rollers 140 will move radially toward the axis of the shaft 110 if they are to maintain contact with the sun disks. This movement is accomplished by corresponding movement of the rollers 130, permitted by the pivotal link supports 130C, and the slack left by such movement is taken up by movement of the ring annulus members 133, 134 toward each other. This movement is automatically accomplished by gears 135 carried by the adjusting screws 136 so that if torque is applied to the ring members 133, 134 to cause an output drive of the ring carrying member 137, rotation will occur tending to move the annuluses 133, 134 toward each other to contact the surfaces 131, 132, respectively, and maintain such contact.

If in the movement of the sun disks in a ratio decreasing direction, the sun disks are moving axially toward each other and tend to force the roller sets to move radially outwardly. This action increases the pressure on the output cone contacts 131,132 and the preload must adjust to move the ring annuluses 133,134 apart. The variable speed drive for many applications will require preload mechanism which will act in both directions of power flow. For this reason, another gear is attached to the power screws opposite the ring gear, as at 150, the output member 137 and the gear 150 are respectively carried by rotatable spiders 151 and 152 which are drivingly connected to counter shaft gears 153 and 154 respectively. Although one set of gears 153,154 is adequate, a plurality of counter shafts may readily be used to split the load. The gears 153,154 are mounted on the counter shaft, shown at 155, are keyed on the shaft 155 with lost motion keys permitting 90° relative rotation between each of the gears and the counter shaft. Accordingly, one or the other of the gears 153, 154 will free wheel depending upon the direction of torque application applied on the shaft 155. A spring, either coil or leaf, is preferably inserted between the members 151 and 152 tending to bias them peripherally relative to each other in a direction tending to cause the annuluses 133,134 to move together at all times, thereby positively providing a preload condition of the friction conical planetary system independently of the direction of load or the presence of any load.

The drive system using the two rows of planet rollers does not, in the form illustrated, provide a reverse speed or zero speed without supplementary gearing. As shown in FIG. 3, supplementary gearing may be provided in the form of a reversing planetary 160 and the inclusion of a two way clutch 161 which selectively drives output gear 162 (in the position illustrated in FIG. 3) or, upon lateral shifting to the right will drive gear 162a. The latter gear provides a forward speed to the output shaft 170 by way of gear 163. Differential output is provided permitting reverse rotation through gear 165 at the right hand end of shaft 110. The gear 165 causes rotation of the planet carrier 166 with its planets 167 against reaction ring 168. Accordingly, drive applied to the gear 160 on the carrier 166 by way of gear 162 on the countershaft 155 will provide, depending upon the ratio of output at the gear 162 from the friction transmission, either a forward or reverse movement of the shaft 170 by rotation of the gear 171 resulting from rotation of the gear 160 via annular rotating ring 172.

The transmission shown in FIGS. 3 and 4 will provide a drive from zero to 2,000 rpm in the differential operation and from 2,000 to 5,000 rpm in a direct drive range. As those skilled in the art are aware, the efficiency of the differential drive system is somewhat lower.

In the systems described so far, it will be clear that the preload control can be made differently from the modification shown. For example, hydraulic actuators could be employed instead of the mechanical screw devices.

An important aspect of the two row planetary system is that each roller has three-point contact and, accordingly, the load transmitted by the system will be equally distributed throughout the roller complex. If one roller were removed, for example, the entire system would collapse. In single row planetary systems, it has been generally recognized that an access of three rollers in the planet carrier provides an arrangement in which the load is not equally divided between the plurality of rollers. By providing the two row system shown in FIGS. 3 and 4, extremely heavy total torque may be transmitted without overloading the individual rollers.

Figure 6:
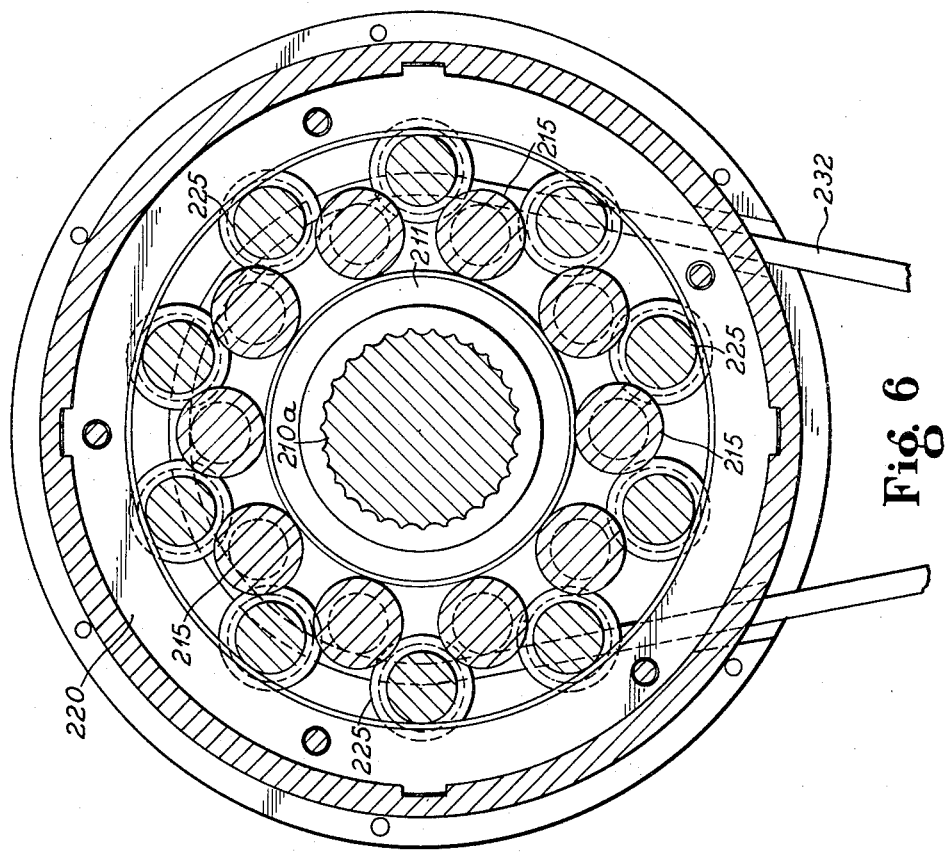
FIG. 6 is a cross-sectional view taken along the line VI—VI of FIG. 5.
Figure 5:
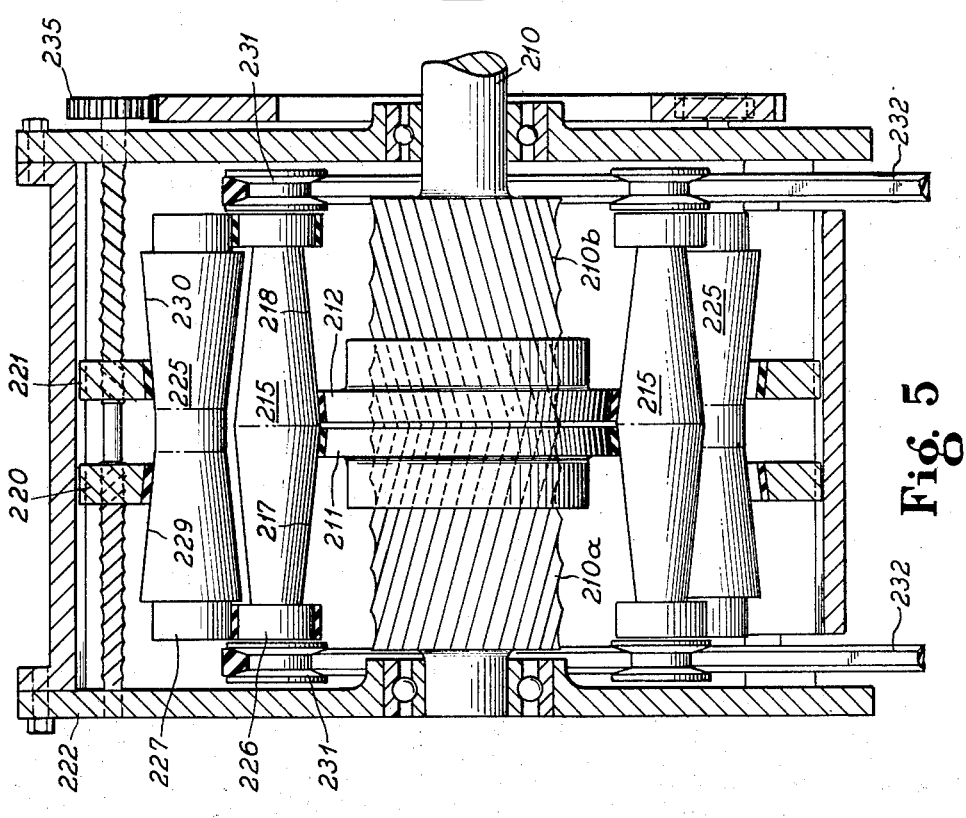
FIG. 5 is a third embodiment of the variable speed drive constructed in accordance with the present invention and providing a planet carrier input.

A still further embodiment of the invention is shown in FIGS. 5 and 6. There, a system is illustrated in which the two row planetary complex is provided but in which no carrier support bearings are required for the two rows. Instead, the inner rows of rollers are each provided with pulleys and the planets are the input to the drive by way of a V-belt. Thus, as shown, the split ring gears 220 and 221 are adjustably fixed to the housing 222 and the output of the drive is taken from the sun shaft 210 carrying split sun members 211, 212. As illustrated, the sun members 211, 212, respectively contact the inner row of rollers 215 via the respective conical surfaces 217, 218. The force transferred from rollers 215 to the second row rollers 225 is accomplished by way of cylindrical friction surfaces 226, 227 and the conical surfaces 229, 230 contact the respective ring annulus members 220, 221. The pulleys 231 on opposite ends of the rollers 215 are driven by V-belts 232 and conventional tensioning devices applied to the V-belt 232 provide constant preload of the rollers against the output shaft 210. Preload is automatically assured by the high pitch threads 210a, 210b on the sun shaft 210 which automatically cause the sun members 211, 212 to move toward each other under drive conditions. Adjustment of the ring members 220, 221 is accomplished by rotation of the adjustment screws 235 in any desired manner. In the embodiment illustrated in FIGS. 5 and 6, rubber surfaces are illustrated between the friction members in each case. This embodiment may be employed in any of the systems illustrated, but is typically applicable in relatively low load systems. In this embodiment, forward, zero, and reverse speeds are obtainable without a special planetary-differential arrangement. If the instantaneous radius of the contact 217 is called $X_1$, constant radius of 226 called $Y_1$, constant radius 227 called $X_2$, instantaneous radius of contact 229 called $Y_2$, the radius of the ring roller 220 called C, the relation
$(X_1/A)(X_2/Y_1)(C/Y_2) = 1$, then the output of 210 is zero. Changing the ratio $X_2/Y_1$ by changing the instantaneous radius on cones 217 and 229, the total product $(X_1/A)(X_2/Y_1)(C/Y_2)$ can be made less or more than one. If it is less than one, the output is rotating in the same direction as the input, and if this ratio is more than one, the output of 210 is in reverse.

It will be seen from the above description and a consideration of the drawings, that I have provided a novel system of variable speed, variable ratio, transmission device. I have found that the efficiency of this improved system is very high and that it may be applied to a wide range of uses including the high horsepower automotive uses. The advantages include relative simplicity of parts and the simple change of speed ratios through a wide range of forward and reverse speeds including a zero for effectively neutral, drive condition. Variations and modifications will at once become obvious to those skilled in the art from a consideration of my disclosure and it is, accordingly, my intent that the invention be limited solely by that of the hereinafter appended claims.

I claim as my invention:

1. In combination in a drive mechanism, a rotatable drive shaft, a sun member driven by said shaft, a plurality of rotatable planet roller units peripherally fixedly positioned relative to a carrier, an annular ring member, said ring and sun being axially separably split, means simultaneously selectively operable to move the halves of one of said members apart and to move the halves of the other member in an axial direction to maintain contact thereof with said planet roller units, said planet roller units comprising frusto conical units in rotative friction contact with both the ring and sun members throughout said selective movement.

2. Drive structure according to claim 1 wherein said planet roller units each comprise a plurality of rollers in drive contact with each other and wherein successive rollers of each planet roller unit have oppositely tapered conical surfaces and are drivingly connected to each other by cylindrical roller surfaces.

3. Drive structure according to claim 1 wherein said sun and ring rollers are each provided with increasing taper in the opposite direction of taper to the adjacent, contacted, member.

4. Drive structure in accordance with claim 1 wherein gear means connect said drive shaft to said ring member and said sun member at differing ratios and wherein output drive shaft means are connected to said carrier.

5. Drive structure according to claim 1 wherein said planet roller units each comprise a plurality of rollers rotatable on parallel axes and in drive contact with each other and wherein successive rollers of each planet roller unit have oppositely tapered conical surfaces for respective cooperation with said ring and sun members and are drivingly connected to each other by cylindrical roller surfaces.

6. Drive structure according to claim 1 wherein said sun and ring members are each provided with increasing taper in the direction of taper opposite to that of the respective adjacent contacted member.

7. Drive structure in accordance with claim 1 wherein gear means connect said drive shaft to said ring member and said sun member for rotation of both thereof and wherein output drive shaft means are connected to said carrier.

8. In combination in a drive mechanism, a sun shaft member, an annular ring member, a carrier, a plurality of planet rollers carried by said carrier on peripherally fixed axes parallel to the axes of said sun and ring members but radially movable, said sun and ring members being axially separably split with each half thereof being frusto conical, said planet rollers each being dual frusto conical and having each of the frusto conical surfaces thereof in contact with one half of the respective ring and sun members for friction drive power transmission therebetween, and means operable to simultaneously move the balance of one of the members apart and the halves of the other member toward each other to vary the drive ratio between the members.

9. The drive mechanism of claim 8 including means automatically preloading said members in driving engagement an increasing amount with increasing torque transmission.

* * * * *